Aug. 10, 1926.
I. SHUPACK
EYEGLASS FRAME
Filed July 20, 1925
1,595,577
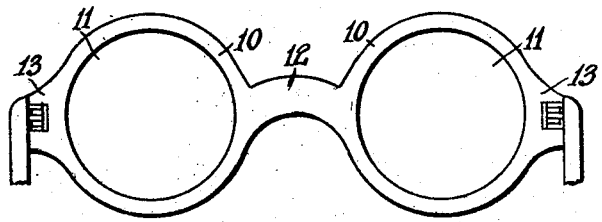
FIG.1
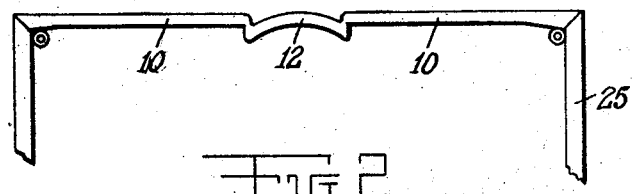
FIG.2
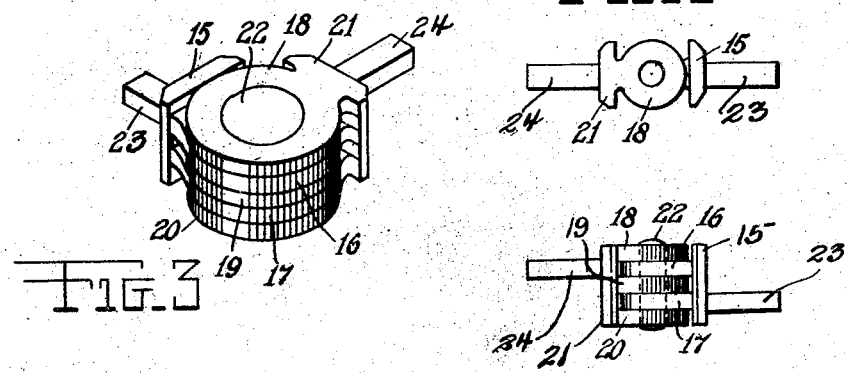
FIG.3
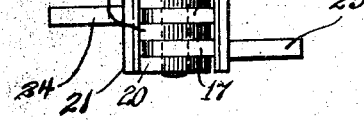
FIG.4
FIG.5
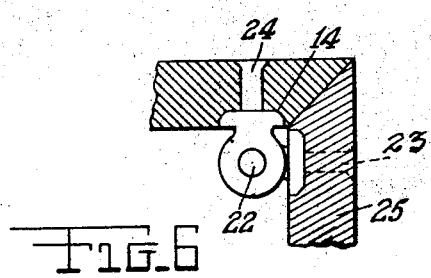
FIG.6
INVENTOR
*I. Shupack*
BY *J. Lederman*
ATTORNEY Patented Aug. 10, 1926.

1,595,577

UNITED STATES PATENT OFFICE.

IRVING SHUPACK, OF NEW YORK, N. Y.

EYEGLASS FRAME.

Application filed July 20, 1925. Serial No. 44,722.

The main object of this invention is to provide an economical and efficient novel type of hinge suited for joining the side arms to the main frame of an eyeglass unit.

The above and other objects will become apparent in the description below, in which characters of reference refer to like-named parts in the drawing.

Referring briefly to the drawing, Figure 1 is a rear elevational view of a pair of eyeglasses, showing the application of the hinge thereto.

Figure 2 is a top plan view of Figure 1.

Figure 3 is a perspective view of one of the hinge units.

Figure 4 is a top plan view of the hinge unit.

Figure 5 is a side elevational view of Figure 4.

Figure 6 is a sectional view of a corner of the eyeglass frame and supporting arm, showing the method of joining these two members by the hinge.

Referring in detail to the drawing, the numeral 10 indicates a pair of lens frames provided with grooves into which the edges of lenses 11 are set. The usual nose bridge is shown at 12. Diametrically opposite to the position where the bridge 12 joins the frame 10, integral extensions 13 are provided. In these extensions, smaller recesses 14 are formed on one face of the extensions, and into these recesses, a plate 15 forming the base of the hinge, is inserted. The base 15 has a pair of ears 16 and 17 extending from one side thereof. The ears are separated by a space taken up by three ears 18, 19, and 20, which are integral with a plate 21. All of said ears 16, 17, 18, 19, and 20, are provided with an opening and when in cooperative position, are adapted to receive a pivot pin 22. A stud 23 extends outwardly from the plate 15 from a position near its lower end and a similar stud 24 extends outwardly in a similar direction from the plate 21 at a position near its upper end.

The hinges are adapted to join the eyeglass support arms 25 to the main frames of the eyeglasses in such a manner that the arms 25 may be rotated to a folding position, in which position the arms rest on the eyeglass frame and extend parallel thereto. When in use, these arms 25 extend at right angles to the eyeglass frame, as illustrated in Figure 2. The stud 24 is off-set upwardly from the center of the plate 21 and is embedded in the material forming the extension 13 of the frame. The stud 24 when embedded in the extension 13 of the eyeglass frame has a small portion thereof extending from the opposite side, which extending end is peened-over, as illustrated in Figure 6. The stud 23, belonging to the plate 15, is embedded in the arm 25 in a similar manner and is also peened-over, as described for the other stud 24. The studs are off-set in opposite directions on the plates 21 and 15, as it has been found thru experience that when the studs are off-set in this manner, greater balance to the hinge is accomplished and the latter works more efficiently.

I claim:—

In an eyeglass unit having a frame and arms cooperating therewith, a hinge member pivotally joining said arms and frame and comprising a pair of plates, spaced-apart ears on each of said plates, said plates being respectively embedded in the frame and arm at the junction thereof, off-set studs extending from said plates passing thru the arms and frame to secure said plates upon their respective arms and eyeglass frame, one stud being off-set downwardly on its plate, the opposite stud being off-set upwardly on its plate, said studs being adapted to pass thru the arm and frame and have their opposite ends peened-over to secure the hinge plates in their respective positions on the eyeglass unit.

In testimony whereof I affix my signature.

IRVING SHUPACK.